(12) United States Patent
Athalye et al.

(10) Patent No.: US 9,084,201 B2
(45) Date of Patent: Jul. 14, 2015

(54) POWER HEADROOM MANAGEMENT IN WIRELESS COMMUNICATION SYSTEMS

(75) Inventors: Sanjeev Arvind Athalye, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 12/357,698

(22) Filed: Jan. 22, 2009

(65) Prior Publication Data

US 2009/0191910 A1  Jul. 30, 2009

Related U.S. Application Data

(60) Provisional application No. 61/023,785, filed on Jan. 25, 2008.

(51) Int. Cl.
*H04B 7/005* (2006.01)
*H04W 52/16* (2009.01)
(Continued)

(52) U.S. Cl.
CPC ............ *H04W 52/16* (2013.01); *H04W 52/243* (2013.01); *H04W 52/246* (2013.01); *H04W 52/367* (2013.01)

(58) Field of Classification Search
CPC ... H04W 52/367; H04W 52/52; H04W 52/16; H04W 52/243; H04W 52/246; H04W 52/26; H04W 52/365; H04W 72/04
See application file for complete search history.

(56) References Cited

U.S. PATENT DOCUMENTS

| | | | | |
|---|---|---|---|---|
| 5,452,473 | A | * | 9/1995 | Weiland et al. ................. 455/88 |
| 5,914,950 | A | * | 6/1999 | Tiedemann et al. .......... 370/348 |
| 6,061,568 | A | * | 5/2000 | Dent ............................. 455/450 |

(Continued)

FOREIGN PATENT DOCUMENTS

| | | |
|---|---|---|
| CN | 101068122 A | 11/2007 |
| RU | 2280335 C2 | 7/2006 |
| WO | 02082581 A2 | 10/2002 |

OTHER PUBLICATIONS

"3rd Generation Partnership Project Technical Specification Group Radio Access Network; Evolved Universal Terrestrial Radio Access (E-UTRA); User Equipment (UE) radio transmission and reception;(Release 8)" 3GPP Draft; R4-71237_Text Proposal_TR36.803, 3rd Generation Partnership Project (3GPP), Mobile Competence Centre ; 650, Route Deslucioles ; F-06921 Sophia-Antipolis Cedex; France, vol. tsg_ran\WG4_Radio\TSGR4_44\Docs, no. Athens, Greece; 20070820, Aug. 14, 2007, XP050177698, p. 18-20.

(Continued)

*Primary Examiner* — Fanghwa Wang
(74) *Attorney, Agent, or Firm* — Charles E. Eggers

(57) ABSTRACT

Systems and methodologies are described that facilitate power headroom management in a wireless communication system. As described herein, a predefined relationship between locations along a system frequency band and corresponding power backoff parameters is utilized to minimize spurious emissions outside the system frequency band and/or excessive interference by, for example, associating locations near one or more edges of the permitted frequency band with substantially high power backoff parameters. As further described herein, the predefined relationship can be known a priori to the base station and the mobile terminal.

25 Claims, 13 Drawing Sheets

(51) Int. Cl.
*H04W 52/24* (2009.01)
*H04W 52/36* (2009.01)

(56) References Cited

U.S. PATENT DOCUMENTS

| | | | |
|---|---|---|---|
| 6,735,447 B1* | 5/2004 | Muller | 455/522 |
| 2002/0051435 A1* | 5/2002 | Giallorenzi et al. | 370/335 |
| 2004/0162097 A1 | 8/2004 | Vijayan et al. | |
| 2006/0114836 A1 | 6/2006 | Pollin et al. | |
| 2007/0019668 A1* | 1/2007 | Lee et al. | 370/458 |
| 2007/0155335 A1* | 7/2007 | Love et al. | 455/69 |
| 2007/0173260 A1 | 7/2007 | Love et al. | |
| 2007/0223365 A1 | 9/2007 | Tsfaty et al. | |
| 2008/0176575 A1* | 7/2008 | Sutton | 455/450 |

OTHER PUBLICATIONS

Alexei Gorokhov et al: "Dynamic PA backoff techniques and SC-FDMA" 3GPP2, C30-20060911-080,, Sep. 11,2006, pp. 1-35, XP002496285 p. 5.
International Search Report—PCT/US2009/031816—ISA/EPO—May 7, 2009.
Taiwan Search Report—TW098103155—TIPO—Jun. 25, 2012.
Written Opinion—PCT/US2009/031816, International Search Authority—European Patent Office—May 7, 2009.

* cited by examiner

POWER HEADROOM MANAGEMENT IN WIRELESS COMMUNICATION SYSTEMS

CROSS-REFERENCE

This application claims the benefit of U.S. Provisional Application Ser. No. 61/023,785, filed Jan. 25, 2008, and entitled "POWER HEADROOM REPORTING IN WIRELESS COMMUNICATION SYSTEMS," the entirety of which is incorporated herein by reference.

BACKGROUND

I. Field

The present disclosure relates generally to wireless communications, and more specifically to techniques for power management in a wireless communication system.

II. Background

Wireless communication systems are widely deployed to provide various communication services; for instance, voice, video, packet data, broadcast, and messaging services can be provided via such wireless communication systems. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

Generally, a wireless multiple-access communication system can simultaneously support communication for multiple wireless terminals. In such a system, each terminal can communicate with one or more base stations via transmissions on the forward and reverse links. The forward link (or downlink) refers to the communication link from the base stations to the terminals, and the reverse link (or uplink) refers to the communication link from the terminals to the base stations. This communication link can be established via a single-in-single-out (SISO), multiple-in-signal-out (MISO), or a multiple-in-multiple-out (MIMO) system.

A wireless terminal in an OFDMA system and/or another wireless communication system can communicate with other devices using an assigned spectral allocation, which can specify one or more portions of the frequency band of the associated system to be utilized by the terminal. However, in order to adhere to regulatory requirements (e.g. spectral masks) as well as to reduce capacity degradations to adjacent channels due to interference, a wireless terminal is conventionally required to take measures to ensure that its spurious emissions (e.g., power transmitted outside the permitted frequency band of operation for the terminal) are minimized. One technique that can be utilized by a terminal to minimize spurious emissions is to leave "power headroom" by, for example, reducing the power amplifier (PA) output power of the terminal from its maximum value. To minimize spurious emissions at a terminal, it is desirable to implement efficient and adaptable power headroom management techniques at the terminal.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

According to an aspect, a method for managing power backoff in a wireless communication system is described herein. The method can comprise identifying a bandwidth allocation corresponding to a terminal; determining a location of the bandwidth allocation with respect to a frequency band; and selecting a power backoff parameter corresponding to the bandwidth allocation that is pre-mapped to the determined location of the bandwidth allocation.

Another aspect relates to a wireless communications apparatus that can comprise a memory that stores data relating to a system bandwidth comprising a plurality of frequency subcarriers, one or more allocated frequency subcarriers in the system bandwidth corresponding to a mobile station, and a predefined mapping relationship between respective positions in the system bandwidth and corresponding maximum power reduction (MPR) values; and a processor configured to determine a location of the allocated frequency subcarriers within the system bandwidth, and select a MPR value corresponding to the determined location using the predefined mapping relationship.

A third aspect relates to an apparatus that facilitates power management in a wireless communication system. The apparatus can comprise means for identifying a bandwidth allocation for a mobile terminal; means for identifying a set of power reduction parameters corresponding to locations in a system frequency band; and means for mapping the bandwidth allocation for the mobile terminal to a power reduction parameter in the set of power reduction parameters based on a location of the bandwidth allocation in the system frequency band.

A fourth aspect relates to a computer program product, which can comprise a computer-readable medium that comprises code for mapping locations within a system frequency band to corresponding maximum power reduction (MPR) parameters based on a predefined specification; code for allocating frequency resources for a user equipment (UE); code for determining a location of the frequency resources within the system frequency band; and code for identifying a MPR parameter that is mapped to the location of the frequency resources within the system frequency band.

A fifth aspect relates to an integrated circuit that executes computer-executable instructions for managing wireless terminal power usage. The instructions can comprise identifying maximum power reductions (MPRs) associated with locations within a system frequency band; identifying a spectral allocation for a wireless terminal comprising one or more frequency subcarriers located within the system frequency band; determining locations of the one or more frequency subcarriers in the spectral allocation within the system frequency band; and associating the spectral allocation with a MPR associated with the location of at least one of the one or more frequency subcarriers in the spectral allocation within the system frequency band.

In accordance with another aspect, a method for managing transmit power in a wireless communication system is described herein. The method can comprise receiving an assignment for one or more frequency subcarriers in a system frequency band; determining locations of the one or more assigned frequency subcarriers within the system frequency band; and selecting one or more power amplifier (PA) backoff parameters corresponding to the assignment that are pre-mapped to the determined locations of the one or more assigned frequency subcarriers in the system frequency band.

An additional aspect relates to a wireless communications apparatus that can comprise a memory that stores data relating to a system bandwidth comprising a plurality of frequency subcarriers, one or more assigned frequency subcarriers in the system bandwidth, and a relationship between locations in the system bandwidth and corresponding maximum power reductions (MPRs); and a processor configured to determine locations of the one or more assigned frequency subcarriers within the system bandwidth, reduce transmit power output by a MPR value corresponding to a determined location using the relationship between locations in the system bandwidth and corresponding MPRs, determine whether the reduced transmit power output violates a spectral mask, and respond to a determined spectral mask violation at least in part by further reducing the transmit power output.

Yet another aspect relates to an apparatus that facilitates PA management in a wireless communication system. The apparatus can comprise means for receiving a bandwidth assignment; means for determining an implicit power backoff assignment based on a location of the bandwidth assignment within a frequency band for the wireless communication system; means for determining whether the implicit power backoff assignment violates a spectral mask requirement; and means for adjusting power backoff from the implicit power backoff assignment to correct a determined spectral mask violation.

Still another aspect relates to a computer program product, which can comprise a computer-readable medium that comprises code for mapping locations within a system frequency band to corresponding power amplifier (PA) backoffs based on a predefined specification; code for receiving an allocation of frequency resources; code for determining locations of the frequency resources within a system frequency band; and code for identifying one or more PA backoffs mapped to the locations of the frequency resources within the system frequency band.

A further aspect relates to an integrated circuit that executes computer-executable instructions for managing a power amplifier. The instructions can comprise identifying maximum power reductions (MPRs) associated with corresponding bandwidth frequencies; identifying a spectral allocation comprising one or more frequency subcarriers; determining a location in frequency of the spectral allocation; and stepping down output power of a power amplifier by a MPR associated with the location of the spectral allocation in frequency.

To the accomplishment of the foregoing and related ends, one or more aspects of the claimed subject matter comprise the features hereinafter fully described and particularly pointed out in the claims. The following description and the annexed drawings set forth in detail certain illustrative aspects of the claimed subject matter. These aspects are indicative, however, of but a few of the various ways in which the principles of the claimed subject matter can be employed. Further, the disclosed aspects are intended to include all such aspects and their equivalents.

DETAILED DESCRIPTION

Figure 1:
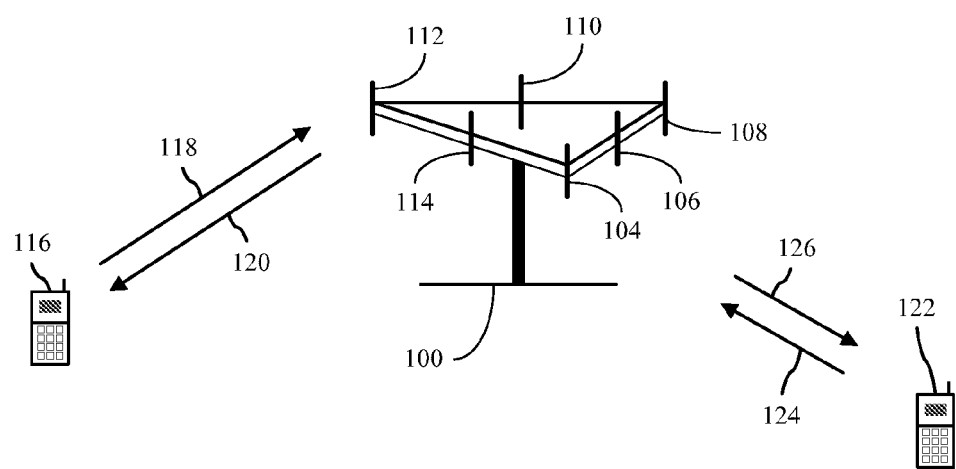
FIG. 1 illustrates a wireless multiple-access communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment. A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media include both computer storage media and communication media, including any medium facilitating transfer of a computer program from one place to another. A storage medium can be any available medium that can be accessed by a computer. By way of example, and not limitation, such computer-readable media comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include compact disc (CD), laser disc, optical disc, digital versatile disc (DVD), floppy disk and blu-ray disc (BD), where disks often reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 is an illustration of a wireless multiple-access communication system in accordance with various aspects. In one example, an access point 100 (AP) includes multiple antenna groups. As illustrated in FIG. 1, one antenna group can include antennas 104 and 106, another can include antennas 108 and 110, and another can include antennas 112 and 114. While only two antennas are shown in FIG. 1 for each antenna group, it should be appreciated that more or fewer antennas may be utilized for each antenna group. In another example, an access terminal 116 (AT) can be in communication with antennas 112 and 114, where antennas 112 and 114 transmit information to access terminal 116 over forward link 120 and receive information from access terminal 116 over reverse link 118. Additionally and/or alternatively, access terminal 122 can be in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 can use different frequency for communication. For example, forward link 120 may use a different frequency then that used by reverse link 118.

Each group of antennas and/or the area in which they are designed to communicate can be referred to as a sector of the access point. In accordance with one aspect, antenna groups can be designed to communicate to access terminals in a sector of areas covered by access point 100. In communication over forward links 120 and 126, the transmitting antennas of access point 100 can utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point, e.g., access point 100, can be a fixed station used for communicating with terminals and can also be referred to as a base station, a Node B, an access network, and/or other suitable terminology. In addition, an access terminal, e.g. an access terminal 116 or 122, can also be referred to as a mobile terminal, user equipment (UE), a wireless communication device, a terminal, a wireless terminal, and/or other appropriate terminology.

Figure 2:
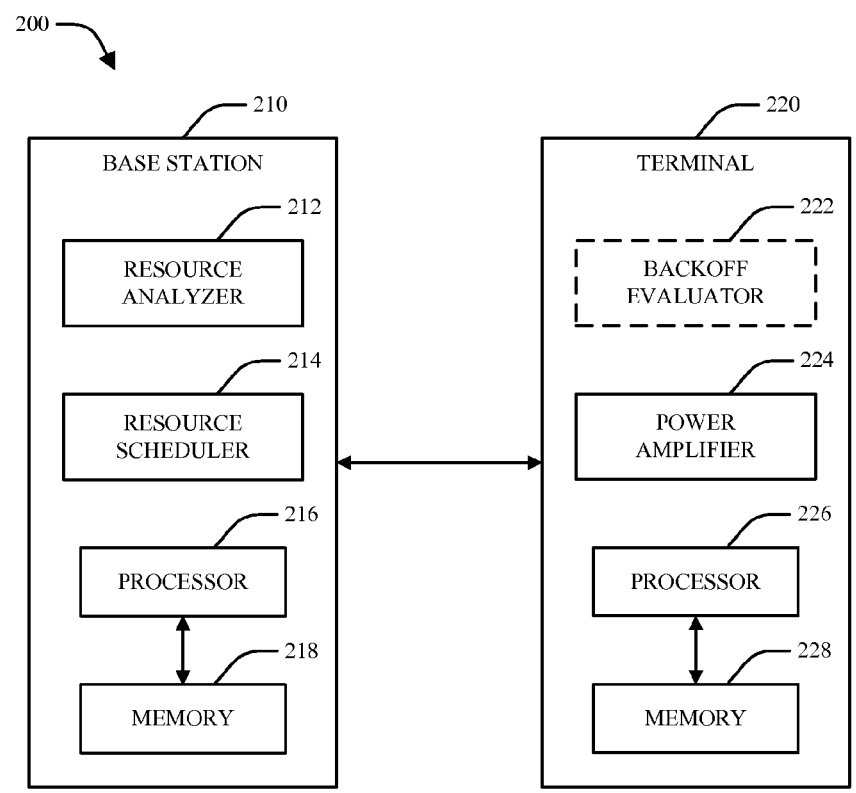
FIG. 2 is a block diagram of a system for power headroom management in a wireless communication system in accordance with various aspects.

Turning now to FIG. 2, a block diagram of a system 200 for power headroom management in a wireless communication system is illustrated in accordance with various aspects provided herein. As FIG. 2 illustrates, system 200 can include a base station 210, which can conduct uplink (UL) and/or downlink (DL) communication with a terminal 220. While only one base station 210 and terminal 220 is illustrated in system 200, it should be appreciated that system 200 can include any number of base stations 210 and/or terminals 220.

In accordance with one aspect, terminal 220 can communicate with base station 210 pursuant to a resource assignment provided by base station 210. In one example, such a resource assignment can include one or more frequency subbands, which can be selected from a permitted frequency band utilized by system 200. Frequency bands specified in a resource assignment can be selected by, for example, a resource analyzer 212 at base station 210. In one example, resource analyzer 212 can analyze the loading of base station 210, known capabilities of terminal 220, and/or other factors to determine a bandwidth allocation for terminal 220. Based on the determined bandwidth allocation, a resource scheduler 214 can schedule the selected subbands and facilitate communication of an assignment for the scheduled bandwidth to terminal 220.

Figure 3:
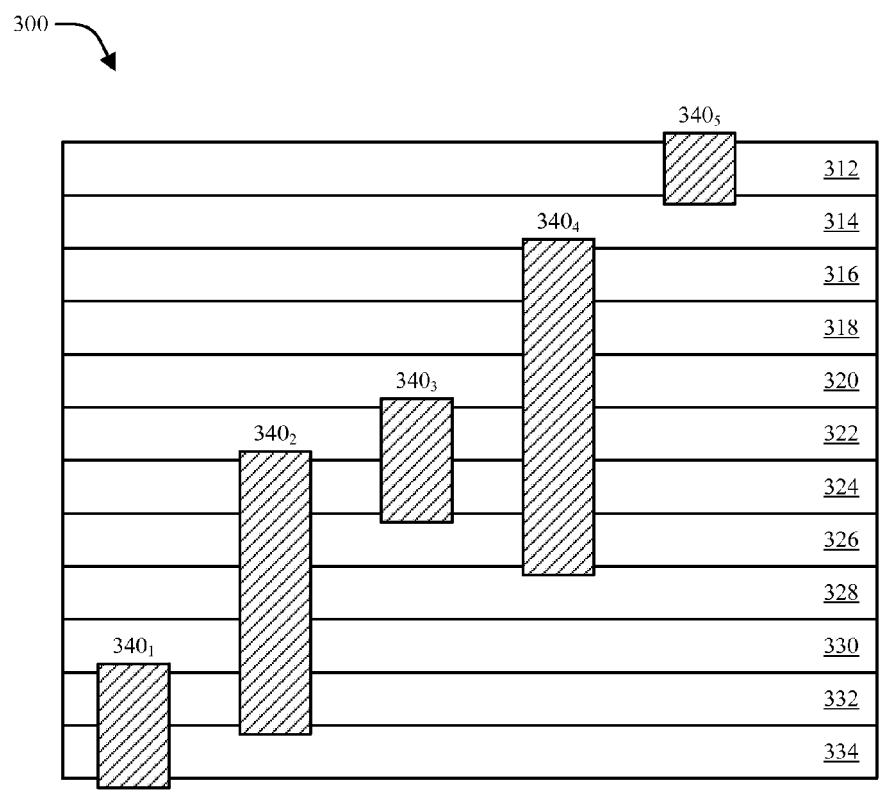
FIG. 3 illustrates example spectral allocations in relation to a system bandwidth in accordance with various aspects.

In accordance with another aspect, various example resource allocations 340 across a system bandwidth are illustrated by diagram 300 in FIG. 3. As diagram 300 illustrates, a system bandwidth can include a plurality of resource blocks (RBs) 312-334 in frequency, each of which including one or more frequency subcarriers or subbands. While diagram 300 illustrates 12 RBs 312-334, it will be appreciated that a system bandwidth can include any suitable number of RBs 312-334. Further, while the description herein relating to diagram 300 is provided in terms of frequency, it will be appreciated that the resources illustrated by diagram 300 could alternatively be apportionments of code, time, space, and/or any other suitable resource type or combination thereof.

As illustrated by diagram 300, a terminal can be assigned a subset of available resources rather than the entire set. For example, based on user needs, system loading, and/or other factors, a resource allocation 340 can include any suitable number and/or positioning of RBs 312-334 within the set of available resources. While resource allocations 340 are illustrated in diagram 300 as sets of contiguous RBs 312-334, it will be appreciated that one or more non-contiguous sets of RBs 312-334 could additionally, or alternatively, be allocated to a user.

Referring again to FIG. 2, in addition to an allocation of bandwidth for terminal 220, base station 210 and/or terminal 220 can, in accordance with one aspect, control an amount of power utilized by terminal 220 for transmission within system 200. In one example, in order to comply with spectral masks or other regulatory requirements and/or to reduce interference with other nearby devices or frequency channels, terminal 220 can vary its transmit power levels in order to minimize the intensity of spurious emissions from terminal 220 that fall outside the permitted frequency allocation for terminal 220. In another example, resource scheduler 214 at base station 210 can assign a power level to be utilized by terminal 220 in the form of a power spectral density (PSD) requirement. A PSD assigned by resource scheduler 214 can be linked to a modulation and coding scheme (MCS) and/or bandwidth allocation given by resource scheduler, such that a PSD can be inferred by terminal 220 from a MCS assignment and/or a bandwidth allocation. Alternatively, PSD can be assigned by resource scheduler independently.

In accordance with one aspect, terminal 220 can utilize a power amplifier 224 to apply an appropriate power level for communications within system 200. Accordingly, in order to minimize spurious emissions, terminal 220 can leave "power headroom" by, for example, reducing the output power of power amplifier 224 from its maximum value. As used herein and generally in the art, the extent to which the power headroom is reduced can be referred to as "power backoff." In one example, power backoff can be determined by base station 210 and communicated to one or more terminals 220. Alternatively, terminal 220 can utilize a backoff evaluator 222 for independently computing and applying power backoff.

It will be appreciated that a power level of spurious emissions from terminal 220 can be dependent on the bandwidth and/or data rate utilized by terminal 220, the transmit power of terminal 220, and/or other factors. For example, in an OFDMA system (or other appropriate wireless communication system), one or more assignments can be provided to terminal 220 to facilitate wideband transmission over a selection of frequency subcarriers that span a predetermined subset of the permitted frequency band, such as the regions of the frequency band illustrated by the respective allocations 340 in diagram 300. In such an example, it will be appreciated that the spurious emissions of terminal 220 can increase as a function of both the power level of the transmission and the size and/or location of the bandwidth used for the transmission, where as used herein, the term "location" refers to a spectral location within a bandwidth utilized in relation to the system 200. For example, it can be observed that signals transmitted using resources located near the center of a system frequency band can experience fewer spurious emissions than transmissions using resources located near one or more edges of the band. This effect often occurs because a centrally-positioned transmission can undergo more decay before it reaches the band edge in comparison to an edge-positioned transmission.

In another example, the level of spurious emissions associated with a transmission can be affected by the data rate of the transmission, which can be a function of a variety of factors. For example, the data rate of a transmitter can depend on a bandwidth allocated to the transmitter and the spectral efficiency at which respective transmissions are scheduled. In an example, a data rate at the transmitter can be defined as a product of a MCS and allocated bandwidth, and/or by any other appropriate metric. In another example, a data rate that a receiver can support for a desired packet error rate can be determined as a function of signal-to-noise ratio (SNR), which in turn can be determined as a function of the power of the transmitter from which the signal is received.

In view of the above, a power backoff can be computed by base station 210 and/or terminal 220 based at least in part on the size and/or position of the UL spectral allocation for terminal 220 in the permitted frequency band associated with system 200. For example, a spectral allocation for terminal 220 can include subcarriers that are closer to the center of the permitted bandwidth and/or subcarriers that are closer to the edge of the permitted bandwidth. Thus, in order to reduce out-of-band power, power amplifier 224 at terminal 220 can apply a larger power backoff when the allocation is close to one or more of the band edges than when the allocation is closer to the center of the band. By way of a specific, non-limiting example, this difference can be on the order of 1-3 dB.

In an example, a larger backoff can imply that terminal 220 has less power to transmit. Accordingly, resource scheduler 214 at base station 210 can utilize information relating to the backoff applied by terminal 220 (e.g. as determined by base station 210 and/or reported from terminal 220) to determine the data rate at which terminal 220 can transmit. Accordingly, it will be appreciated that by allowing terminal 220 to apply different power headroom values based on, for example, the amount and/or locations of subcarriers allocated to terminal 220 in the permitted frequency band (e.g. the spectral range occupied by the subcarriers, whether the subcarriers are contiguous in the permitted frequency band, etc.), base station 210 can utilize such information to maximize the data rate at which terminal 220 is allowed to transmit on the UL without violating spectral masks, interference requirements, and/or other requirements. In another example, a data rate assigned by resource scheduler 214 at base station 210 and/or utilized by terminal 220 can be given as a function of one or more of power, bandwidth, and MCS.

In accordance with a further aspect, base station 210 can utilize a processor 216 and/or memory 218 to implement at least a portion of the functionality of resource analyzer 212, resource scheduler 214, and/or any other component(s) described herein. Further, terminal 220 can include a processor 226 and/or memory 228 to implement some or all of the functionality of backoff evaluator 222, power amplifier 224, and/or any other component(s) of terminal 220. In one example, processor 216 at base station 210 and/or processor 226 at terminal 220 can further utilize one or more artificial intelligence (AI) techniques to automate some or all of their respective functionalities. As used herein, the term "intelligence" refers to the ability to reason or draw conclusions about, e.g. infer, the current or future state of a system based on existing information about the system. Artificial intelligence can be employed to identify a specific context or action, or generate a probability distribution of specific states of a system without human intervention. Artificial intelligence relies on applying any of many advanced mathematical algorithms—e.g. decision trees, neural networks, regression analysis, cluster analysis, genetic algorithms, and reinforced learning—to a set of available data (information) on the system. In particular, any one of numerous methodologies can be employed for constructing models from data and then drawing inferences from the models. Such methodologies include, for example, hidden Markov models (HMMs) and related prototypical dependency models, more general probabilistic graphical models, such as Bayesian networks (e.g., as created by a structure search using a Bayesian model score or approximation), linear classifiers, such as support vector machines (SVMs), non-linear classifiers, such as methods referred to as "neural network" methodologies, fuzzy logic methodologies, and other approaches (that perform data fusion, etc.). Any of the aforementioned algorithms and methodologies can be employed in the implementation of various automated aspects described herein.

Figure 4:
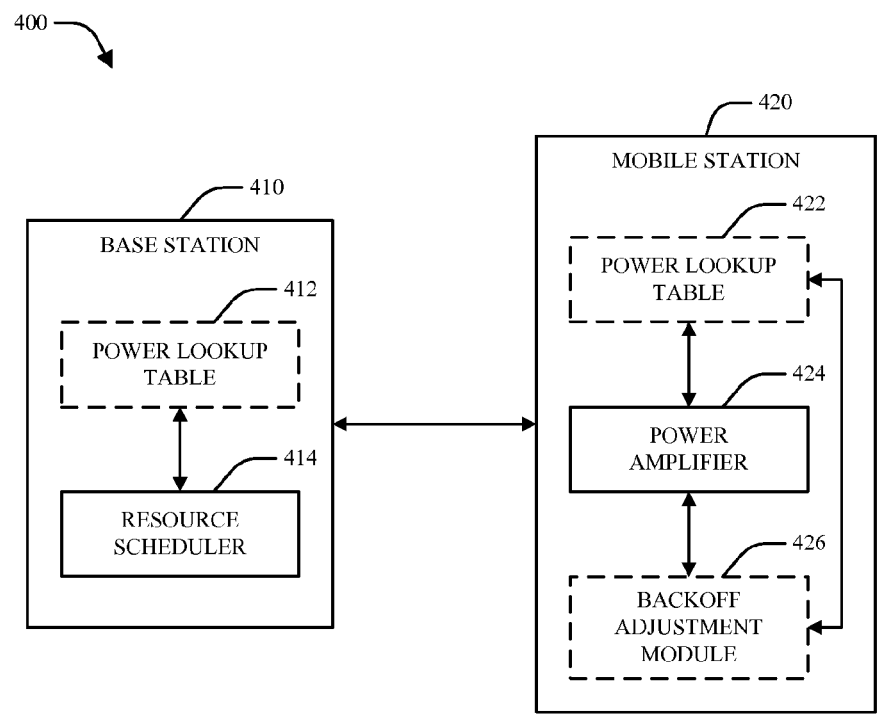
FIG. 4 is a block diagram of a system for conducting power amplifier backoff in a wireless communication system based on a pre-configured lookup table in accordance with various aspects.

Turning now to FIG. 4, a system 400 for conducting power amplifier backoff in a wireless communication system based on a pre-configured lookup table 412 and/or 422 in accordance with various aspects is illustrated. As FIG. 4 illustrates, system 400 can include one or more base stations 410 and one or more mobile stations 420, which can communicate on both the UL and DL using a specified set of resources. In one example, resource scheduler 414 at base station 410 can provide an assignment for bandwidth, power, MCS, and/or other communication parameters to mobile station 420 in a similar manner to resource scheduler 214 in system 200. Additionally, or alternatively, power amplifier 424 at mobile station 420 can operate to apply a power level for transmissions to base station 410 and/or other network entities based on an assignment for power and/or PSD from resource scheduler 414 and/or based on a backoff value determined by a backoff adjustment module 426 associated with mobile station 420 in a similar manner to that described above with respect to system 200.

In accordance with one aspect, power backoff values to be applied for various assignment types can be predetermined and stored in a power lookup table 412 at base station 410 and/or a power lookup table 422 at mobile station 420, such that base station 410 and/or mobile station 420 can map a spectral assignment to a power backoff value without being required to perform real-time computation for the backoff. In an example, lookup tables 412 and/or 422 can be constructed in various manners prior to communication between base station 410 and mobile station 420. Power lookup tables 412 and/or 422 can contain entries provided by a design specification associated with stations 410 and/or 420 or associated with communication technique(s) employed by system 400. As another example, power lookup tables 412 and/or 422 can be established during establishment of a connection between base station 410 and mobile station 420, upon initial setup of base station 410 and/or mobile station in system 400, and/or at any other appropriate time. As used herein, power backoff can additionally, or alternatively, be referred to as maximum power reduction (MPR) and any other suitable nomenclature.

In accordance with another aspect, lookup tables 412 and/or 422 can contain predetermined mappings associating an MPR with a spectral assignment based on various properties of the assignment. For example, lookup table 412 and/or 422 can map a MPR to an assignment based on a number of RBs spanned by the assignment, the width of the assignment in frequency, a modulation order associated with the assignment, and/or other suitable factors. In one example, a lookup table 412 and/or 422 can additionally, or alternatively, map a spectral allocation to a MPR value based on the spectral location of the assignment within frequency band associated with system 400. For example, lookup table 412 can be constructed using a set of mandated MPR values that are selected to minimize spurious emissions or interference at respective locations within a frequency band. Thus, spectral locations near one or more edges of a permitted frequency band associated with system 400 can be associated with a relatively high MPR, while interior locations within the frequency band can be associated with a lower MPR. Alternatively, it will be appreciated that respective edges of a frequency band can be assigned MPR differently such that, for example, a given edge of the frequency band is associated with higher MPR than an opposite edge.

Based on respective MPR values used to populate a power lookup table 412 and/or 422, a power backoff can subsequently be associated with a spectral allocation by referencing a power lookup table 412 and/or 422 without requiring computation of the backoff at the time the allocation is made. For example, resource scheduler 414 at base station 410 can determine a bandwidth allocation to provide to mobile station 420 and can subsequently reference power lookup table 412 to obtain a mandated power backoff value corresponding to the bandwidth allocation. Additionally and/or alternatively, mobile station 420 can receive a bandwidth allocation from base station 410, based on which a power amplifier 424 at mobile station 420 can reference a local power lookup table 422 to obtain and apply a mandated power backoff value corresponding to the assigned bandwidth allocation. Thus, by using lookup tables 412 and/or 422, it can be appreciated that MPR or power backoff can be implemented as a system requirement within system 400.

In accordance with one aspect, upon receiving a spectral allocation and a corresponding power backoff from base station 410, mobile station 420 can utilize a backoff adjustment module 426 to determine whether mobile station 420 can utilize the assigned power backoff in view of the capability of power amplifier 424, interference considerations, spectral masks and other regulations, and/or other constraints, and facilitate adjustment of the backoff as necessary in view of the considered constraints.

For example, base station 410 can obtain a resource assignment to provide to mobile station 420, and from the obtained assignment base station 410 can utilize power lookup table 412 to determine a maximum power for the assignment. Subsequently, base station 410 can infer a data rate to be utilized by mobile station 420 from the assignment and its corresponding maximum power and transmit an assignment for the assignment and its corresponding power and/or rate to mobile station 420. Upon receiving the assignment, mobile station 420 can then operate to obey the power assignment provided that backoff adjustment module 426 determines that the power assignment complies with spectral mask regulations and otherwise does not exceed capabilities of power amplifier 424. If, by contrast, backoff adjustment module 426 determines that the power levels assigned by base station 410 cannot be used, mobile station 420 can utilize backoff adjustment module 426 to reduce the PSD output of power amplifier 424 as necessary to ensure compliance with regulations, device specifications, network requirements, and/or other constraints. In one example, backoff adjustment module 426 can operate to monitor the operating state of mobile station 420 and to dynamically adjust the PSD output of power amplifier 424 over time.

In one example, resource scheduler 414 at base station 410 and/or backoff adjustment module 426 at mobile station 420 can operate to enable mobile station 420 to transmit at a higher PSD than that provided by power lookup tables 412 and/or 422 in the event that mobile station 420 is capable of a higher PSD. For example, resource scheduler 414 can generate an assignment for a PSD that is higher than that specified by power lookup table 412 in order to enable mobile station 420 to transmit at a higher PSD than that required by system 400. If, upon receiving the assignment at mobile station 420, backoff adjustment module 426 determines that the specified PSD cannot be utilized without violating interference requirements, spectral masks, capabilities of power amplifier 424, and/or other considerations, backoff adjustment module 426 can apply a larger backoff to the PSD than that provided by base station 410. For example, it can be appreciated that backoff adjustment module 426 can instruct power amplifier 424 to reduce the output power of power amplifier 424 as necessary to ensure that mobile station 420 remains in a linear operating region.

Figure 5:
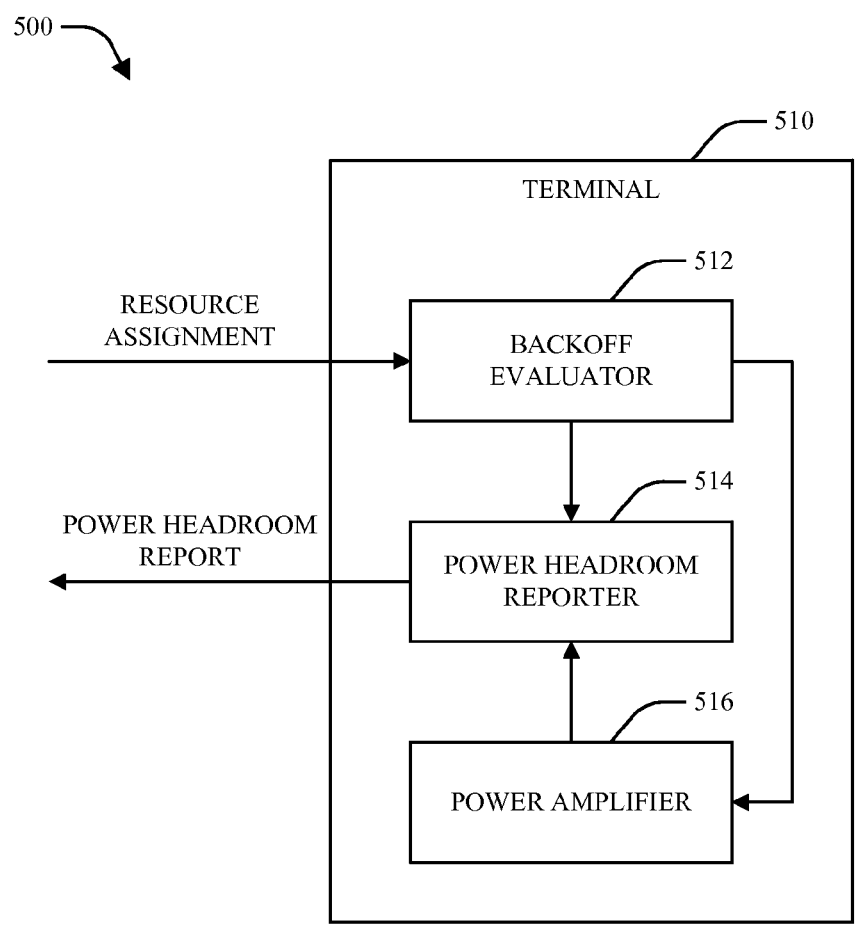
FIG. 5 is a block diagram of a system for power headroom determination and reporting in accordance with various aspects.

Referring next to FIG. 5, a system 500 for power headroom determination and reporting in accordance with various aspects is illustrated. In one example, system 500 includes a terminal 510, which can communicate with one or more other devices (not shown) in system 500 using a spectral allocation provided in a resource assignment to terminal 510 (e.g. from a base station 210). In another example, based on a spectral allocation given in a resource assignment, a backoff evaluator 512 at terminal 510 can determine a backoff to apply to the transmit power of terminal 510 in order to comply with spectral masks or other constraints and/or regulations. Backoff evaluator 512 can utilize a predefined mapping relationship between spectral assignments and backoff values (e.g., using a lookup table 422), or alternatively compute parameters as needed based on the capabilities or loading of terminal 510 and/or other factors. Additionally, or alternatively, backoff evaluator 512 can utilize any other suitable technique described herein or known generally in the art. After a backoff parameter has been computed by backoff evaluator 512, the parameters can be provided to a power amplifier 516 in order to step back the transmit power of terminal 510 in an appropriate manner.

In accordance with one aspect, power reduction parameters determined by backoff evaluator 512 can additionally, or alternatively, be provided to a power headroom reporter 514, which can report the parameter(s) determined by backoff evaluator 512 as power headroom feedback to one or more other devices in system 500. For example, backoff evaluator 512 can determine a power reduction factor that represents the capabilities of terminal 510 in view of device limitations, spectral masks, and/or other factors. Subsequently, the power reduction factor can be reported to a serving access point for terminal 510 in order to enable the access point to schedule an appropriate data rate for the terminal in terms of bandwidth, MCS, or the like, based on the provided report.

In accordance with another aspect, power headroom used by terminal 510 can be determined based on channel conditions and/or other factors and can be utilized as the maximum output power of power amplifier 516 and/or periodically reported by power headroom reporter 514. In one example, a power reduction or backoff value computed by backoff evaluator 512 can be applied to the power headroom of terminal 510 such that power headroom reporter 514 provides a report that indicates the power headroom minus the backoff as the available power headroom at terminal 510. Alternatively, backoff can be known a priori to terminal 510 and one or more entities to which terminal 510 reports (e.g., based on parameters of an assignment to terminal 510 and obtained via a lookup table 412 and/or 422), such that a report issued by power headroom reporter 514 can indicate only the power headroom of terminal 510. Based on such a report, a device receiving the report can apply the known backoff to obtain the effective power headroom of terminal 510.

In accordance with a further aspect, power headroom reporter 514 at terminal 510 can provide power headroom reports to one or more entities in system 500 in a periodic or non-periodic manner. For example, power headroom reporter 514 can provide reports according to a regular schedule, upon request from another device in system 500, upon determining that the loading of terminal 510 is below a predetermined threshold, and/or in any other suitable manner.

Methodologies that can be performed in accordance with various aspects set forth herein are illustrated in FIGS. 6-9. While, for purposes of simplicity of explanation, the methodologies are shown and described as a series of acts, it will be appreciated that the methodologies are not limited by the order of acts. Some acts can, in accordance with one or more aspects, occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with one or more aspects.

Figure 6:
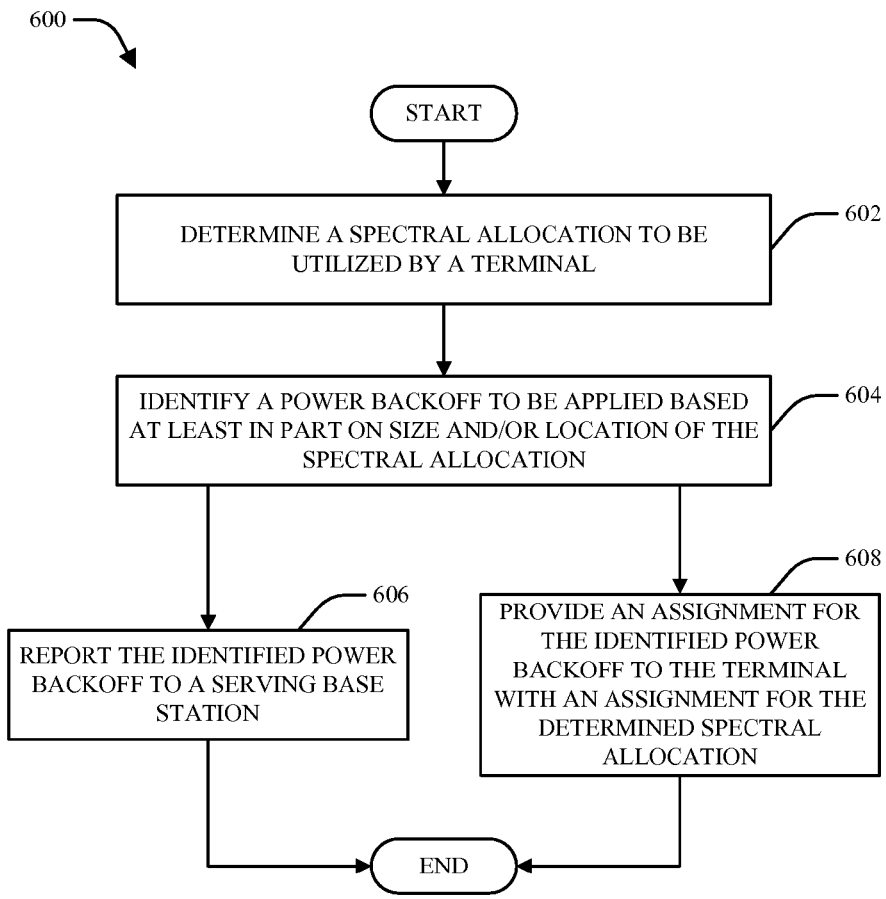
FIG. 6 is a flow diagram of a methodology for managing transmit power levels utilized within a wireless communication system.

With reference to FIG. 6, illustrated is a methodology 600 for managing transmit power levels utilized within a wireless communication system (e.g., system 200). It is to be appreciated that methodology 600 can be performed by, for example, a base station (e.g., base station 210), a terminal (e.g., terminal 220), and/or any other appropriate network entity. Methodology 600 begins at block 602, wherein a spectral allocation to be utilized by a terminal is determined. Next, at block 604, a power backoff to be applied based at least in part on the size and/or location of the spectral allocation is identified (e.g., by a resource scheduler 214 at base station 210 and/or by a backoff evaluator 222 at terminal 220). In one example, the power backoff can be identified by leveraging a relationship between location of a spectral allocation and corresponding power backoff parameters (e.g., as given by a lookup table 412 and/or 422).

Following the acts described at block 604, methodology 600 can proceed to one or more of blocks 606 and 608. In accordance with one aspect, methodology 600 can conclude at block 606 upon completion of the acts described at block 604, wherein the power backoff identified at block 604 is reported to a serving base station. The acts described at block 606 can be performed when, for example, methodology 600 is conducted by a terminal in a wireless communication system. In an alternative aspect, methodology 600 can instead proceed to block 608 prior to concluding, wherein an assignment for the power backoff identified at block 604 is provided to the terminal for which a spectral allocation is determined at block 602 with an assignment for the spectral allocation. The acts described at block 608 can be performed when, for example, methodology 600 is conducted by a base station in a wireless communication system.

Figure 7:
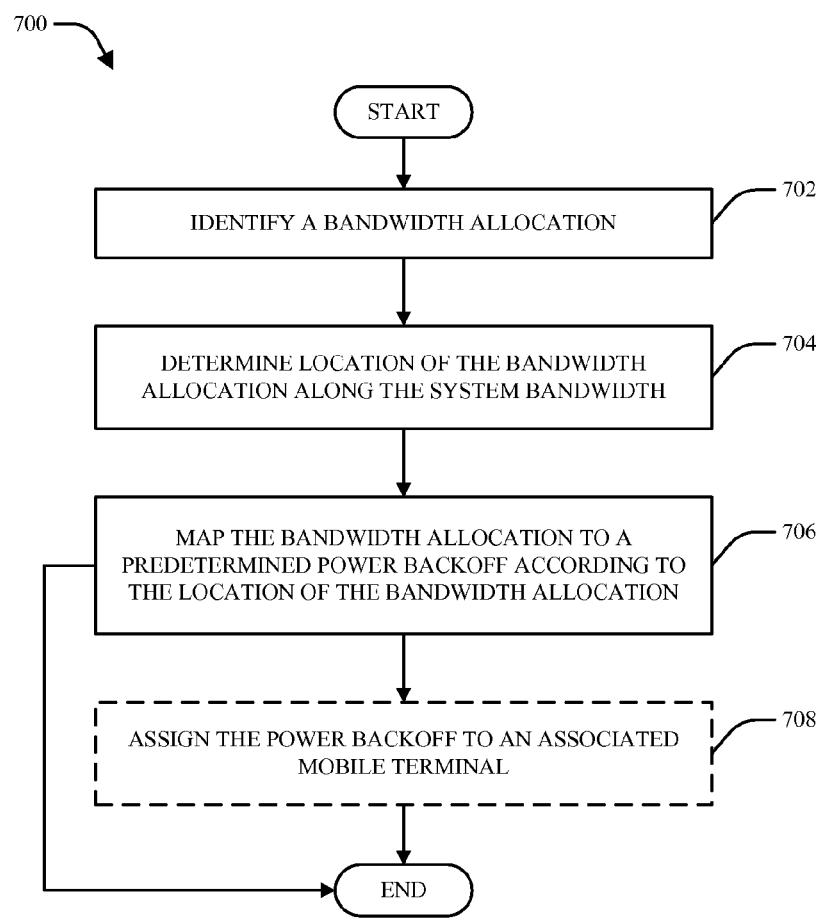
FIG. 7 is a flow diagram of a methodology for identifying a power backoff level to be applied by a mobile terminal.

FIG. 7 illustrates a methodology 700 for identifying a power backoff level to be applied by a mobile terminal (e.g. mobile station 420). Methodology 700 can be performed by, for example, an access point (e.g. base station 410) and/or any other appropriate network device. Methodology 700 begins at block 702, wherein a bandwidth allocation is identified (e.g., by a resource scheduler 414). Next, at block 704, position of the bandwidth allocation is determined along the bandwidth of the system in which methodology 700 is performed. Following the determination at block 704, methodology 700 proceeds to block 706, wherein the bandwidth allocation is mapped to a predetermined power backoff according to the position of the bandwidth allocation (e.g., using a power lookup table 412). Methodology 700 can then conclude, or optionally proceed to block 708, wherein the power backoff identified at block 706 is assigned to an associated mobile terminal.

Figure 8:
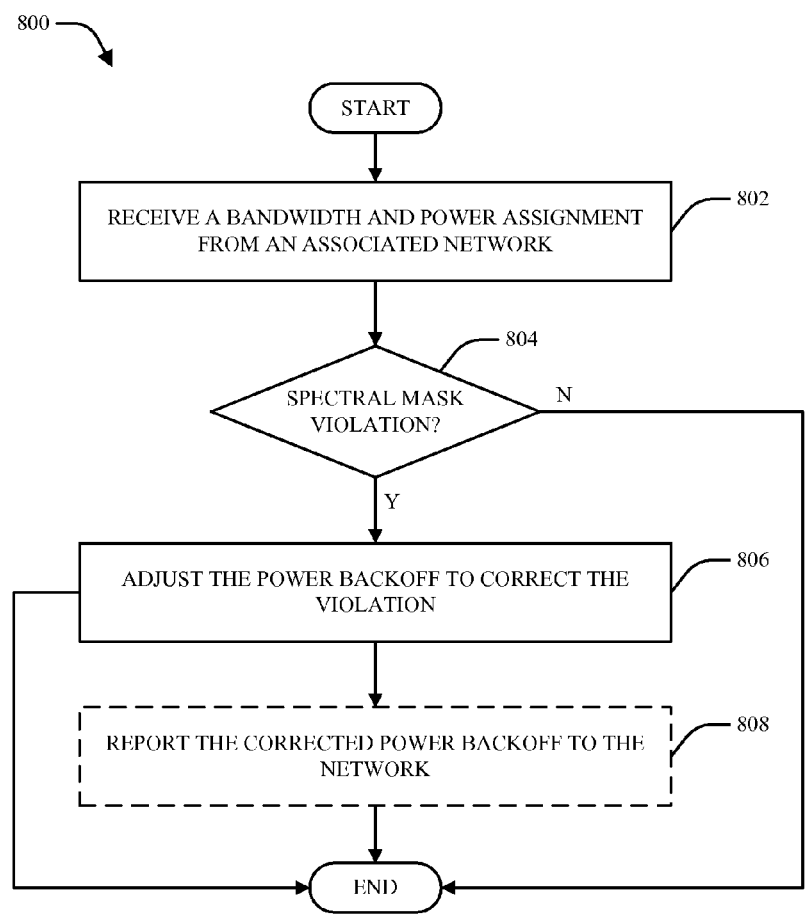
FIG. 8 is a flow diagram of a methodology for regulating a power amplifier in relation to spectral mask requirements.

FIG. 8 is a flow diagram of a methodology 800 for regulating a power amplifier (e.g., power amplifier 424) in relation to spectral mask requirements. Methodology 800 can be performed, for example, by a user equipment (e.g., mobile station 420) and/or any other suitable network entity. Methodology 800 begins at block 802, wherein an assignment for bandwidth and power is received from an associated network (e.g., via a base station 410). In one example, the power assignment received at 802 can be explicitly given. Alternatively, the power assignment can be implicitly given based on the location of the bandwidth assignment within the overall permitted frequency band of the system, and can be discovered by an entity performing methodology 800 using a lookup table (e.g., power lookup table 422) and/or another suitable mechanism.

At block 804, it is determined whether a spectral mask violation has occurred or is likely to occur. If no spectral mask violation is identified at block 804, methodology 800 can conclude. Otherwise, methodology 800 can proceed to block 806, wherein the power backoff associated with the entity performing methodology 800 is adjusted (e.g., by a backoff adjustment module 426) to correct the violation. Methodology 800 can then conclude, or optionally proceed to block 808, where the corrected power backoff is reported to the network (e.g., by a power headroom reporter 514).

Figure 9:
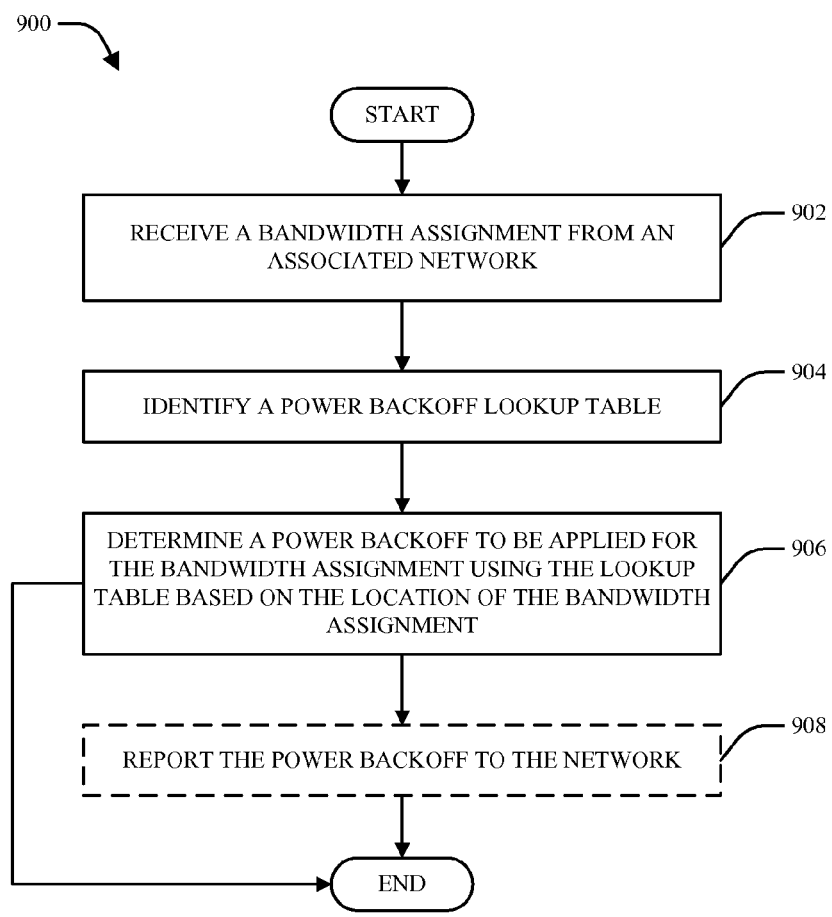
FIG. 9 is a flow diagram of a methodology for power headroom identification and reporting.

Turning to FIG. 9, illustrated is a methodology 900 for power headroom identification and reporting. It will be appreciated that methodology 900 can be performed, for example, by a terminal device and/or any other appropriate network entity. Methodology 900 begins at block 902, wherein a bandwidth assignment is received from an associated network. Next, at block 904, a power backoff lookup table (e.g., power lookup table 422) is identified. At block 906, a power backoff to be applied for the bandwidth assignment is then determined using the lookup table based on the position of the bandwidth assignment. Methodology 900 can conclude, or optionally proceed to block 908, where the power backoff determined at block 906 is reported to the network.

Figure 10:
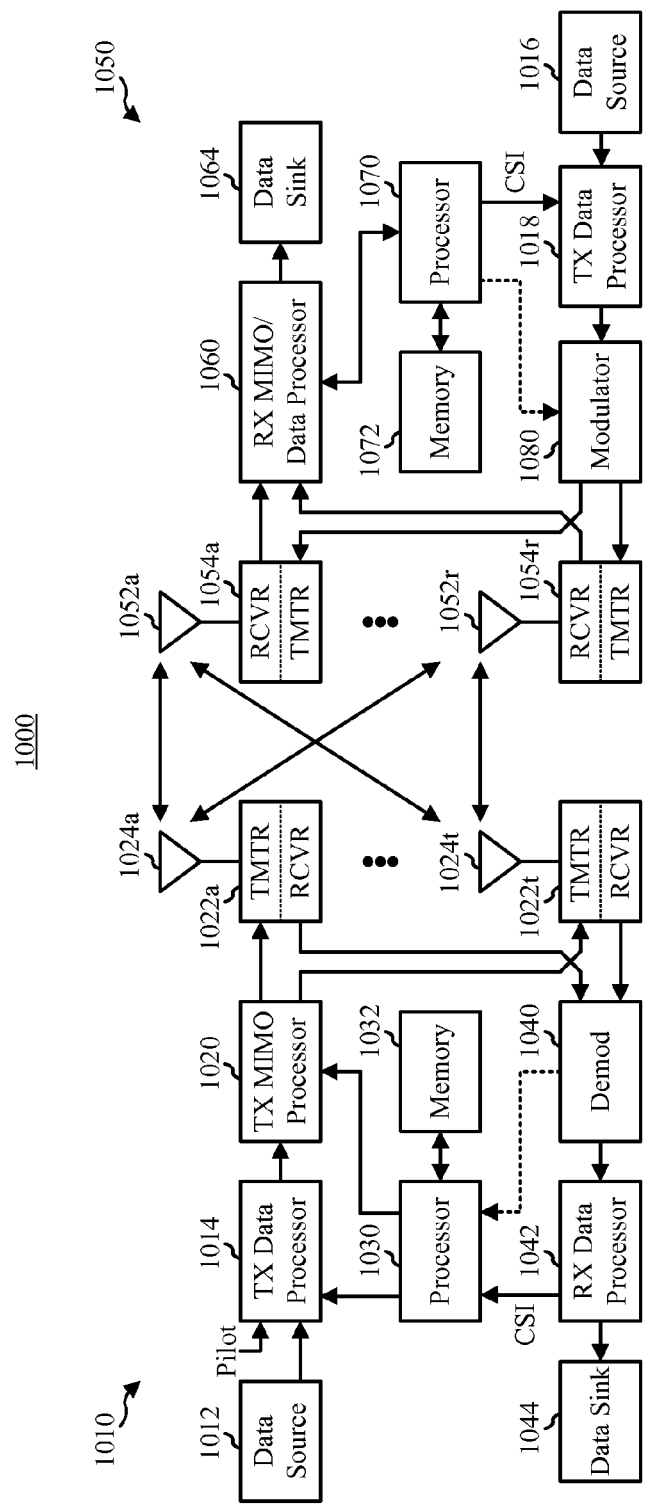
FIG. 10 is a block diagram illustrating an example wireless communication system in which various aspects described herein can function.

Referring now to FIG. 10, a block diagram illustrating an example wireless communication system 1000 in which various aspects described herein can function is provided. In one example, system 1000 is a multiple-input multiple-output (MIMO) system that includes a transmitter system 1010 and a receiver system 1050. It should be appreciated, however, that transmitter system 1010 and/or receiver system 1050 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1010 and/or receiver system 1050 described herein could be utilized in connection with a single output to single input antenna system.

In accordance with one aspect, traffic data for a number of data streams are provided at transmitter system 1010 from a data source 1012 to a transmit (TX) data processor 1014. In one example, each data stream can then be transmitted via a respective transmit antenna 1024. Additionally, TX data processor 1014 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1050 to estimate channel response. Back at transmitter system 1010, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1030.

Next, modulation symbols for all data streams can be provided to a TX processor 1020, which can further process the modulation symbols (e.g., for OFDM). TX MIMO processor 1020 can then provides $N_T$ modulation symbol streams to $N_T$ transceivers 1022a through 1022t. In one example, each transceiver 1022 can receive and process a respective symbol stream to provide one or more analog signals. Each transceiver 1022 can then further condition (e.g., amplify, filter, and upconvert) the analog signals to provide a modulated signal suitable for transmission over a MIMO channel. Accordingly, $N_T$ modulated signals from transceivers 1022a through 1022t can then be transmitted from $N_T$ antennas 1024a through 1024t, respectively.

In accordance with another aspect, the transmitted modulated signals can be received at receiver system 1050 by $N_R$ antennas 1052a through 1052r. The received signal from each antenna 1052 can then be provided to respective transceivers 1054. In one example, each transceiver 1054 can condition (e.g., filter, amplify, and downconvert) a respective received signal, digitize the conditioned signal to provide samples, and then processes the samples to provide a corresponding "received" symbol stream. An RX MIMO/data processor 1060 can then receive and process the $N_R$ received symbol streams from $N_R$ transceivers 1054 based on a particular receiver processing technique to provide $N_T$ "detected" symbol streams. In one example, each detected symbol stream can include symbols that are estimates of the modulation symbols transmitted for the corresponding data stream. RX processor 1060 can then process each symbol stream at least in part by demodulating, deinterleaving, and decoding each detected symbol stream to recover traffic data for a corresponding data stream. Thus, the processing by RX processor 1060 can be complementary to that performed by TX MIMO processor 1020 and TX data processor 1014 at transmitter system 1010. RX processor 1060 can additionally provide processed symbol streams to a data sink 1064.

In accordance with one aspect, the channel response estimate generated by RX processor 1060 can be used to perform space/time processing at the receiver, adjust power levels, change modulation rates or schemes, and/or other appropriate actions. Additionally, RX processor 1060 can further estimate channel characteristics such as, for example, signal-to-noise-and-interference ratios (SNRs) of the detected symbol streams. RX processor 1060 can then provide estimated channel characteristics to a processor 1070. In one example, RX processor 1060 and/or processor 1070 can further derive an estimate of the "operating" SNR for the system. Processor 1070 can then provide channel state information (CSI), which can comprise information regarding the communication link and/or the received data stream. This information can include, for example, the operating SNR. The CSI can then be processed by a TX data processor 1018, modulated by a modulator 1080, conditioned by transceivers 1054a through 1054r, and transmitted back to transmitter system 1010. In addition, a data source 1016 at receiver system 1050 can provide additional data to be processed by TX data processor 1018.

At transmitter system 1010, the modulated signals from receiver system 1050 can then be received by antennas 1024, conditioned by transceivers 1022, demodulated by a demodulator 1040, and processed by a RX data processor 1042 to recover the CSI reported by receiver system 1050. In one example, the reported CSI can then be provided to processor 1030 and used to determine data rates as well as coding and modulation schemes to be used for one or more data streams. The determined coding and modulation schemes can then be provided to transceivers 1022 for quantization and/or use in later transmissions to receiver system 1050. Additionally and/or alternatively, the reported CSI can be used by processor 1030 to generate various controls for TX data processor 1014 and TX MIMO processor 1020. In another example, CSI and/or other information processed by RX data processor 1042 can be provided to a data sink 1044.

In one example, processor 1030 at transmitter system 1010 and processor 1070 at receiver system 1050 direct operation at their respective systems. Additionally, memory 1032 at transmitter system 1010 and memory 1072 at receiver system 1050 can provide storage for program codes and data used by processors 1030 and 1070, respectively. Further, at receiver system 1050, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

Figure 11:
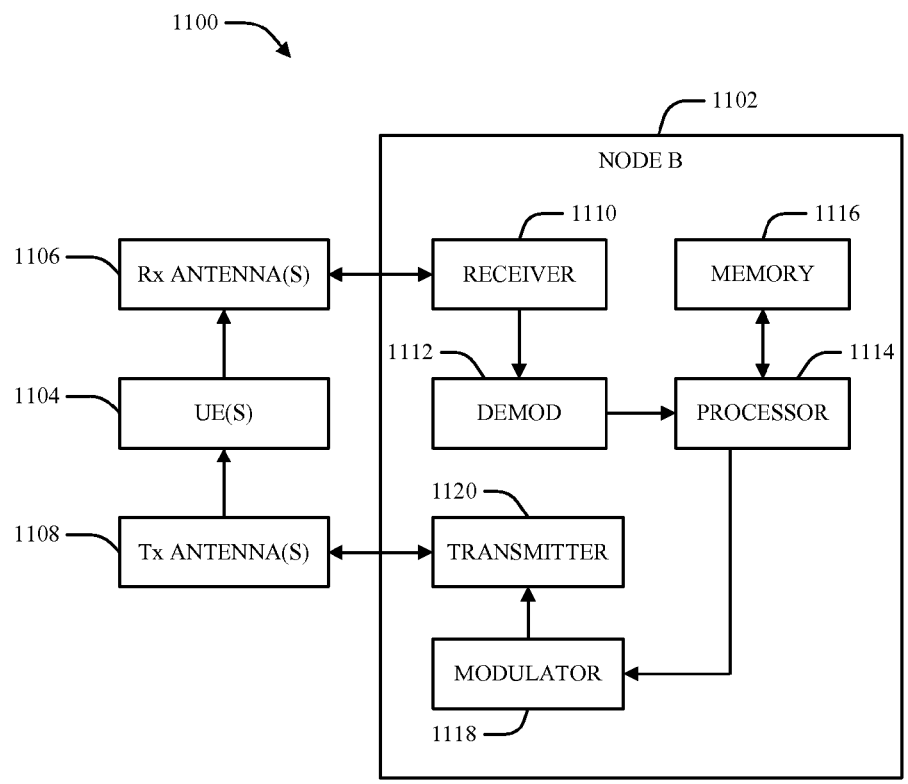
FIGS. 11-12 are block diagrams illustrating example wireless devices operable to implement various aspects described herein.

FIG. 11 is a block diagram of a system 1100 that facilitates network resource management in accordance with various aspects described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108.

Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 600, 700, and/or other similar and appropriate methodologies. Node B 1102 can also include a modulator 1118 that can multiplex a signal for transmission by a transmitter 1120 through transmit antenna(s) 1108.

Figure 12:
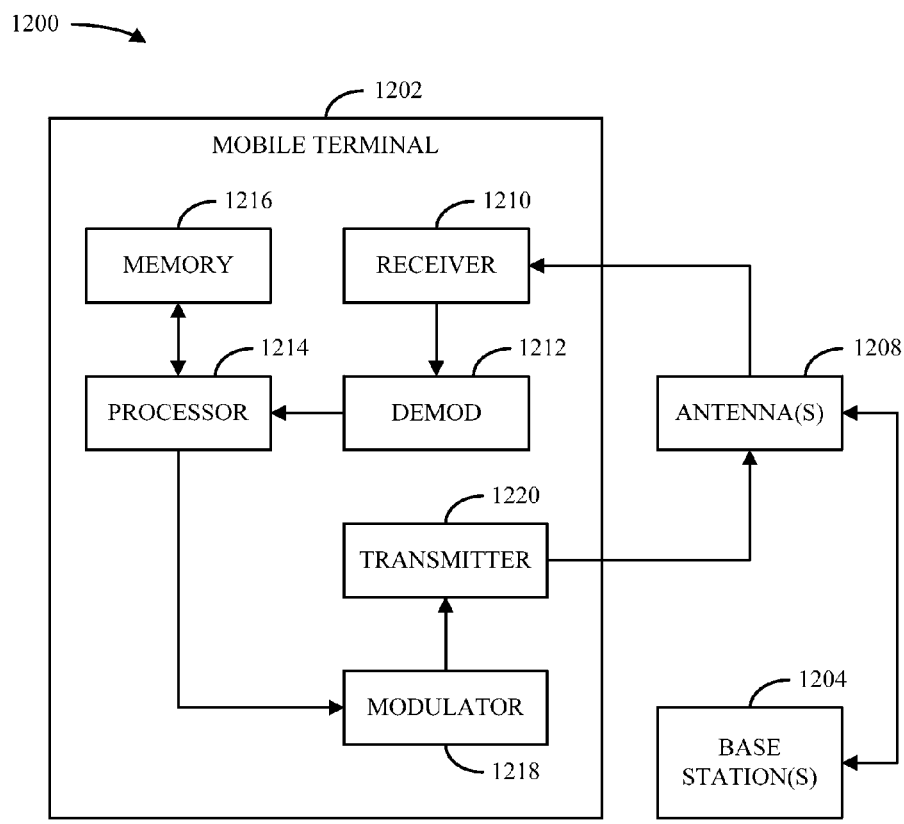

FIG. 12 is a block diagram of a system 1200 that facilitates transmit power regulation in accordance with various aspects described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 600, 800, 900 and/or other similar and appropriate methodologies. Mobile terminal 1202 can also include a modulator 1218 that can multiplex a signal for transmission by a transmitter 1220 through antenna(s) 1208.

Figure 13:
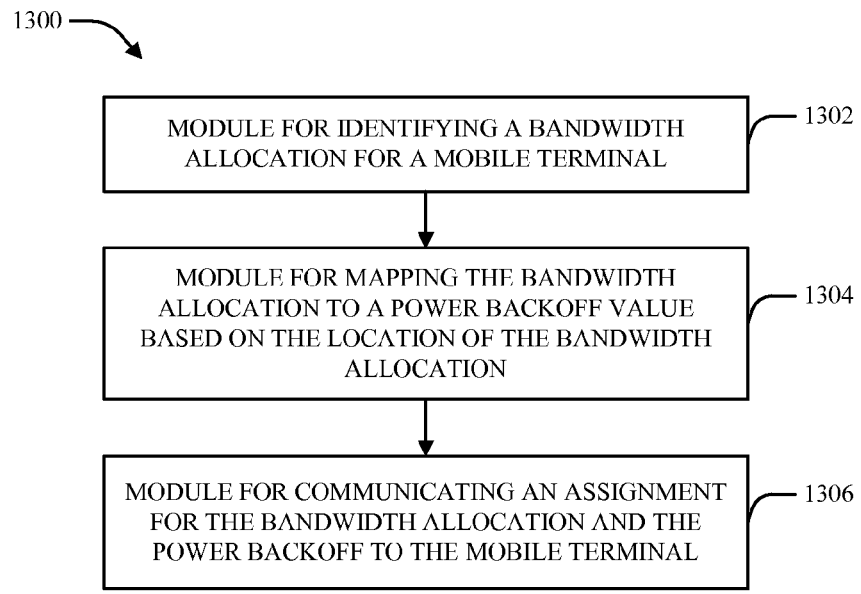
FIGS. 13-14 are block diagrams of respective apparatus that facilitate power management in a wireless communication system.

FIG. 13 illustrates an apparatus 1300 that facilitates identification of power reduction factors for respective devices in a wireless communication system. It will be appreciated that apparatus 1300 is represented as including functional blocks that can represent functions implemented by a processor, software, or combination thereof (e.g., firmware). Apparatus 1300 can be implemented in an access point (e.g., base station 210) and/or any other appropriate network entity and can include a module 1302 for identifying a bandwidth allocation for a mobile terminal, a module 1304 for mapping the bandwidth allocation to a power backoff value based on the position of the bandwidth allocation, and a module 1306 for communicating an assignment for the bandwidth allocation and the power backoff to the mobile terminal.

Figure 14:
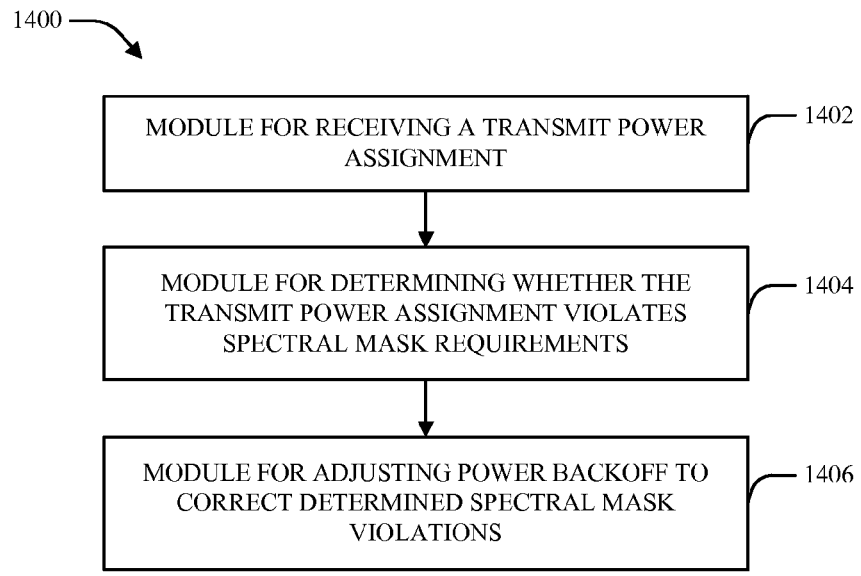

FIG. 14 illustrates an apparatus 1400 that facilitates power regulation for a transmitter in a wireless communication system. It will be appreciated that apparatus 1400 is represented as including functional blocks that can represent functions implemented by a processor, software, or combination thereof (e.g., firmware). Apparatus 1400 can be implemented in a mobile station (e.g., terminal 220) and/or any other appropriate network entity and can include a module 1402 for receiving a transmit power assignment, a module 1404 for determining whether the transmit power assignment violates spectral mask requirements, and a module 1406 for adjusting power backoff to correct determined spectral mask violations.

It will be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of managing power backoff in a wireless communication system, comprising:
   pre-mapping locations and sizes on a frequency band to corresponding power backoff parameters, wherein power backoff parameters corresponding to locations and sizes in the frequency band increase as a distance of the locations from a central point of the frequency band increases;
   identifying a bandwidth allocation corresponding to a terminal, wherein the bandwidth allocation comprises one or more non-contiguous sets of resource blocks;
   determining locations and sizes of the bandwidth allocation with respect to the frequency band;
   selecting a power backoff parameter corresponding to the determined locations and sizes of the bandwidth allocation;
   selecting a data rate for the terminal based on the bandwidth allocation, the selected power backoff parameter, and whether the bandwidth allocation comprises non-contiguous subcarriers;
   receiving a power headroom report from the terminal that indicates a higher power backoff parameter applied at the terminal than the selected power backoff parameter, wherein the higher power backoff parameter is based on a capability of a power amplifier, interference considerations, and spectral masks; and
   adjusting the data rate for the terminal based on the power headroom report received from the terminal.

2. The method of claim 1, wherein the selecting further comprises:
   storing pre-mapped pairs of locations and sizes on the frequency band and corresponding power backoff parameters in a lookup table; and
   selecting the power backoff parameter corresponding to the bandwidth allocation from the lookup table.

3. The method of claim 1, wherein the pre-mapping comprises pre-mapping the locations and sizes on the frequency band to corresponding power backoff parameters according to operating standards of the wireless communication system.

4. The method of claim 1, wherein the selecting further comprises selecting the power backoff parameter corresponding to the bandwidth allocation based at least in part on at least one of an amount of assigned frequency subcarriers in the bandwidth allocation and a modulation order associated with the bandwidth allocation.

5. The method of claim 1, further comprising communicating an assignment for the identified bandwidth allocation and the selected power backoff parameter to the terminal.

6. A wireless communications apparatus, comprising:
   a memory that stores data relating to a system bandwidth comprising:
   one or more allocated frequency subcarriers in the system bandwidth corresponding to a mobile station, wherein the one or more allocated frequency subcarriers comprise one or more non-contiguous sets of resource blocks, and
   a predefined mapping relationship between respective positions and sizes in the system bandwidth and corresponding maximum power reduction (MPR) values, wherein MPRs corresponding to positions and sizes in the system bandwidth increase as a distance of the positions from a central point of the system bandwidth increases; and
   a processor configured to:
   determine locations and sizes of the allocated frequency subcarriers within the system bandwidth based on the one or more frequency subcarriers,
   select a MPR value corresponding to the determined locations and sizes using the predefined mapping relationship,
   select a data rate for the mobile station based on the one or more allocated frequency subcarriers for the mobile station, the selected MPR value, and whether the one or more allocated frequency subcarriers for the mobile station comprise non-contiguous subcarriers,
   receive a power headroom report from the mobile station that indicates a higher MPR value applied at the terminal than the selected MPR value, wherein the higher MPR value is based on a capability of a power amplifier, interference considerations, and spectral masks, and
   adjusting the data rate for the mobile station based on the higher MPR value.

7. The wireless communications apparatus of claim 6, wherein the predefined mapping relationship between locations and sizes in the system bandwidth and a corresponding MPR value is based at least in part on a design specification for the wireless communications apparatus.

8. The wireless communications apparatus of claim 6, wherein
   the memory stores data related to a modulation order associated with the allocated frequency subcarriers in the system bandwidth, and
   the processor is configured to select the MPR value based at least in part on the modulation order stored in memory and size of the allocated frequency subcarriers in relation to size of the system bandwidth.

9. The wireless communications apparatus of claim 6, wherein the processor is configured to transmit an assignment for the allocated frequency subcarriers and the selected MPR value to the mobile station.

10. An apparatus, comprising:
   means for pre-mapping locations and sizes in a system frequency band to corresponding power reduction parameters, wherein power reduction parameters which correspond to locations near a central point of the system frequency band are less than power reduction parameters corresponding to locations near an edge of the system frequency band;
   means for identifying a bandwidth allocation for a mobile terminal, wherein the bandwidth allocation comprises one or more non-contiguous sets of resource blocks;
   means for determining locations and sizes of the bandwidth allocation with respect to the system frequency band;
   means for selecting a power reduction parameter corresponding to the determined locations and sizes of the bandwidth allocation;
   means for selecting a data rate for the mobile terminal based on the identified bandwidth allocation, the selected power reduction parameter, and whether the identified bandwidth allocation comprises non-contiguous subcarriers;
   means for receiving a power headroom report from the terminal that indicates a higher power reduction parameter applied at the mobile terminal than the selected power reduction parameter, wherein the higher power reduction parameter is based on a capability of a power amplifier, interference considerations, and spectral masks; and
   means for adjusting the data rate for the mobile terminal based on the power headroom report received from the terminal.

11. The apparatus of claim 10, wherein the power reduction parameters are defined by a design specification for a wireless communication system.

12. The apparatus of claim 10, wherein the means for selecting the power reduction parameter is further based on a modulation order associated with the bandwidth allocation.

13. A non-transitory computer-readable medium, comprising:
   code for mapping locations and sizes within a system frequency band to corresponding maximum power reduction (MPR) parameters, wherein MPR parameters corresponding to locations and sizes in the system frequency band increase as a distance of the locations from a central point of the system frequency band increases;
   code for allocating frequency resources for a user equipment (UE), wherein the allocated frequency resources comprise one or more non-contiguous sets of resource blocks;
   code for determining locations and sizes of the allocated frequency resources within the system frequency band;
   code for identifying a MPR parameter that is mapped to the locations and sizes of the allocated frequency resources within the system frequency band;
   code for selecting a data rate for the user equipment based on the allocated frequency resources, the identified MPR parameter, and whether the allocated frequency resources comprise non-contiguous subcarriers;
   code for receiving a power headroom report from the user equipment that indicates a higher MPR parameter applied at the terminal than the selected MPR parameter, wherein the higher MPR parameter is based on a capability of a power amplifier, interference considerations, and spectral masks; and
   code for adjusting the data rate for the user equipment based on the power headroom report received from the user equipment.

14. The non-transitory computer-readable medium of claim 13, further comprising code for instructing transmission of an assignment for the frequency resources and the identified MPR parameter to the UE.

15. An integrated circuit that executes computer-executable instructions for managing wireless terminal power usage, the instructions comprising:
   associating maximum power reductions (MPRs) with locations and sizes within a system frequency band, wherein MPRs associated with locations and sizes within the system frequency band increase as a distance of the locations from a central point within the system frequency band increases;
   identifying a spectral allocation for a wireless terminal comprising one or more frequency subcarriers located within the system frequency band, wherein the one or more frequency subcarriers comprise one or more non-contiguous sets of resource blocks;
   determining locations and sizes of the one or more frequency subcarriers in the spectral allocation within the system frequency band;
   selecting a MPR associated with the determined locations and sizes of the one or more frequency subcarriers in the spectral allocation within the system frequency band;
   selecting a data rate for the mobile station based on the spectral allocation for the wireless terminal, the selected MPR, and whether the spectral allocation for the wireless terminal comprises non-contiguous subcarriers;
   receiving a power headroom report from the mobile station that indicates a higher MPR applied at the terminal than the selected MPR, wherein the higher MPR is based on a capability of a power amplifier, interference considerations, and spectral masks; and
   adjusting the data rate for the mobile station based on the power headroom report received from the mobile station.

16. A method for managing transmit power in a wireless communication system, comprising:
   receiving an assignment for one or more frequency subcarriers in a system frequency band, wherein the one or more frequency subcarriers comprise one or more non-contiguous sets of resource blocks;
   determining locations and sizes of the one or more assigned frequency subcarriers within the system frequency band;
   selecting one or more power amplifier (PA) backoff parameters corresponding to the assignment, wherein the one or more PA backoff parameters are pre-mapped to the determined locations and sizes of the one or more assigned frequency subcarriers in the system frequency band, and wherein PA backoff parameters corresponding to locations and sizes in the system frequency band increase as a distance of the locations from a central point of the system frequency band increases;
   reducing transmit power by the selected one or more PA backoff parameters;
   determining whether the reduced transmit power violates a spectral mask requirement, an interference requirement, and a capability of a power amplifier;
   responding to a violation at least in part by further reducing the transmit power;

reporting the further reduced transmit power to a serving access point; and receiving a data rate assignment from the serving access point, wherein the data rate assignment is determined based on the further reduced transmit power, the one or more assigned frequency subcarriers, and whether the one or more assigned frequency subcarriers comprise non-contiguous subcarriers.

17. The method of claim 16, wherein the pre-mapped PA backoff parameters are pre-mapped to locations and sizes based on design specifications for the wireless communication system.

18. A wireless communications apparatus, comprising:
a memory that stores data relating to a system bandwidth comprising:
one or more assigned frequency subcarriers in the system bandwidth, wherein the one or more assigned frequency subcarriers comprise one or more non-contiguous sets of resource blocks, and
a relationship between locations and sizes in the system bandwidth and corresponding maximum power reductions (MPRs), wherein MPRs corresponding to locations and sizes in the system bandwidth increase as a distance of the locations from a central point of the system bandwidth increases; and
a processor configured to:
determine locations and sizes of the one or more assigned frequency subcarriers within the system bandwidth based on the one or more frequency subcarriers,
reduce transmit power output by a MPR value corresponding to the determined locations and sizes of the one or more assigned frequency subcarriers within the system bandwidth,
determine whether the reduced transmit power output violates a spectral mask, an interference requirement, and a capability of a power amplifier,
respond to a determined violation at least in part by further reducing the transmit power output,
report the further reduced transmit power output to an associated network, and
receive a data rate assignment from the associated network, wherein the data rate assignment is determined based on the further reduced transmit power output, the one or more assigned frequency subcarriers, and whether the one or more assigned frequency subcarriers comprise non-contiguous subcarriers.

19. The wireless communications apparatus of claim 18, wherein the processor is configured to further reduce the transmit power output upon detecting a violation of an interference requirement or transmit power capability of the wireless communications apparatus.

20. The wireless communications apparatus of claim 18, wherein the processor is configured to report the adjusted transmit power output to the associated network.

21. The wireless communications apparatus of claim 18, wherein the relationship between locations and sizes in the system bandwidth and corresponding MPRs is based at least in part on a design specification for the wireless communications apparatus.

22. An apparatus that facilitates power amplifier (PA) management in a wireless communication system, the apparatus comprising:
means for receiving a bandwidth assignment, wherein the bandwidth assignment comprises one or more non-contiguous sets of resource blocks;

means for determining a location and size of the bandwidth assignment within a frequency band for the wireless communication system;
means for selecting an implicit power backoff corresponding to the bandwidth assignment, wherein implicit power backoffs are pre-mapped to locations and sizes of bandwidth assignments in the frequency band, and wherein implicit power backoffs corresponding to locations and sizes in the frequency band increase as a distance of the locations from a central point of the frequency band increases;
means for reducing transmit power by the implicit power backoff;
means for determining whether the reduced transmit power violates a spectral mask requirement, an interference requirement, and a capability of a power amplifier;
means for responding to a violation at least in part by further reducing the transmit power;
means for reporting the further reduced transmit power to a serving network device; and
means for receiving a data rate assignment from the serving network device, wherein the data rate assignment is based on the further reduced transmit power, the bandwidth assignment, and whether the bandwidth assignment comprises non-contiguous subcarriers.

23. The apparatus of claim 22, wherein the means for determining the implicit power backoff assignment comprises means for determining the implicit power backoff assignment based on a relationship between bandwidth locations and sizes and power backoffs provided in a design specification for the wireless communications apparatus.

24. A non-transitory computer-readable medium, comprising:
code for mapping locations and sizes within a system frequency band to corresponding power amplifier (PA) backoffs, wherein PA backoffs corresponding to locations and sizes in the system frequency band increase as a distance of the locations from a central point of the system frequency band increases;
code for receiving an allocation of frequency resources, wherein the frequency resources comprise one or more non-contiguous sets of resource blocks;
code for determining locations and sizes of the frequency resources within a system frequency band;
code for identifying one or more PA backoffs mapped to the locations and sizes of the frequency resources within the system frequency band;
code for reducing transmit power by the one or more PA backoffs;
code for determining whether the reduced transmit power violates a spectral mask requirement, an interference requirement, and a capability of a power amplifier;
code for responding to a violation at least in part by further reducing the transmit power;
code for reporting the further reduced transmit power to a serving access point; and
code for receiving a data rate assignment from the serving access point, wherein the data rate assignment is determined based on the further reduced transmit power, the allocation of frequency resources, and whether the allocation of frequency resources comprises non-contiguous subcarriers.

25. An integrated circuit that executes computer-executable instructions for managing a power amplifier, the instructions comprising:
associating maximum power reductions (MPRs) with locations and sizes within a system frequency band, wherein MPRs associated with locations and sizes within the system frequency band increase as a distance of the locations from a central point within the system frequency band increases;

identifying a spectral allocation comprising one or more frequency subcarriers, wherein the one or more frequency subcarriers comprise one or more non-contiguous sets of resource blocks;

determining a location and size in the system frequency band of the spectral allocation;

stepping down output power of a power amplifier by a MPR associated with the determined location and size;

determining whether the stepped down output power violates a spectral mask requirement, an interference requirement, and a capability of a power amplifier;

responding to a violation at least in part by further stepping down output power of the power amplifier;

reporting the further stepped down output power to a serving access point; and receiving a data rate assignment from the serving access point, wherein the data rate assignment is determined based on the further reduced transmit power, the spectral allocation, and whether the spectral allocation comprises non-contiguous subcarriers.

\* \* \* \* \*